A. T. POPE.
HEATING, VENTILATING, AND HUMIDIFYING SYSTEM FOR INCUBATORS.
APPLICATION FILED APR. 27, 1917.

1,303,722.

Patented May 13, 1919.

Inventor
A. T. Pope

By Pennie, Goldsborough & Shiell

Attorneys

A. T. POPE.
HEATING, VENTILATING, AND HUMIDIFYING SYSTEM FOR INCUBATORS.
APPLICATION FILED APR. 27, 1917.
1,303,722.
Patented May 13, 1919.
3 SHEETS—SHEET 2.
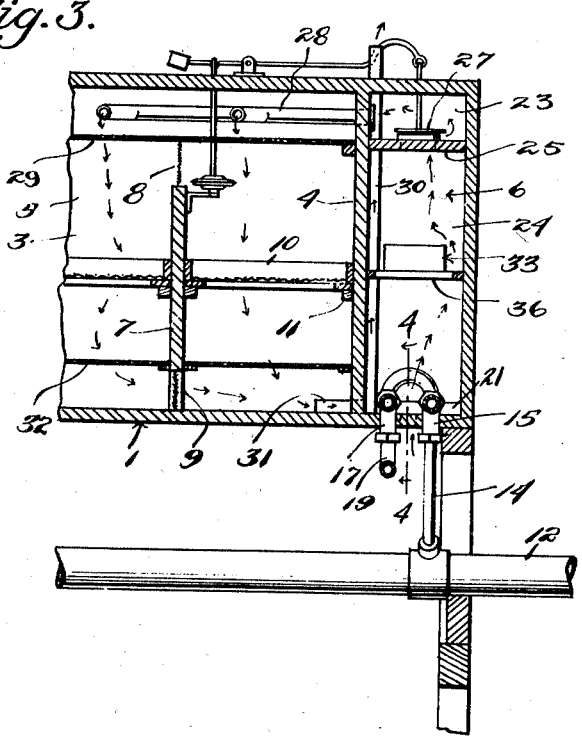
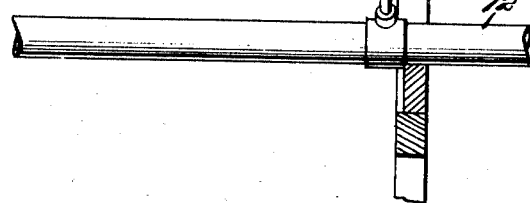
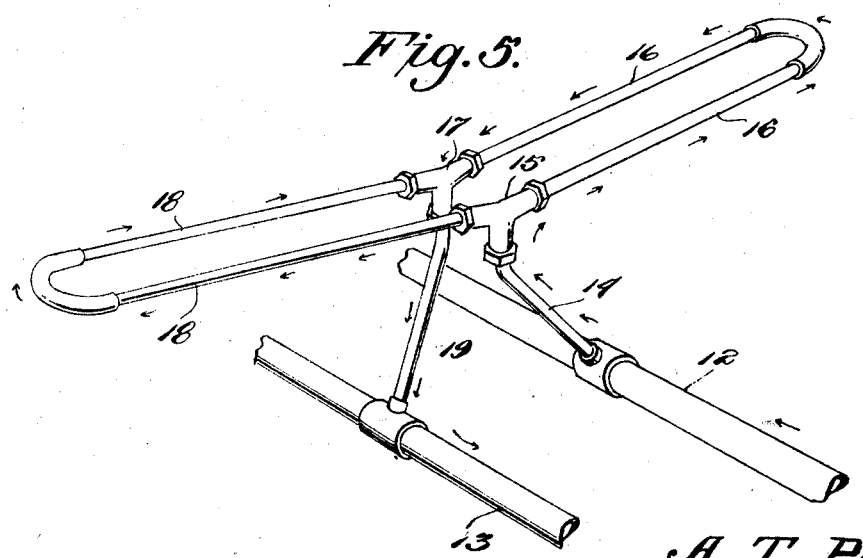
Inventor
A. T. Pope
By Pennie, Goldsborough & Neill
Attorneys A. T. POPE.
HEATING, VENTILATING, AND HUMIDIFYING SYSTEM FOR INCUBATORS.
APPLICATION FILED APR. 27, 1917.
1,303,722.
Patented May 13, 1919.
3 SHEETS—SHEET 3.
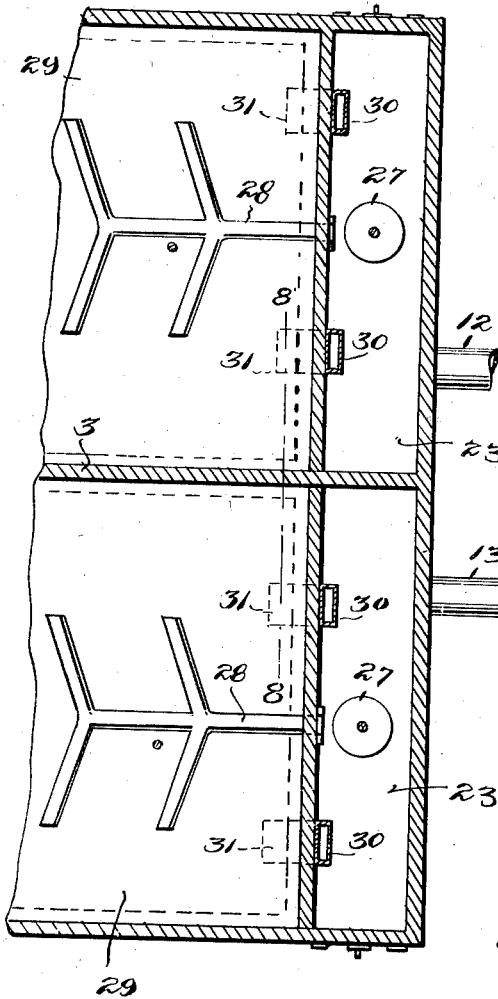
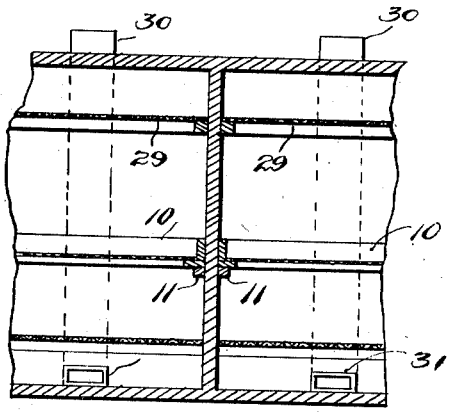
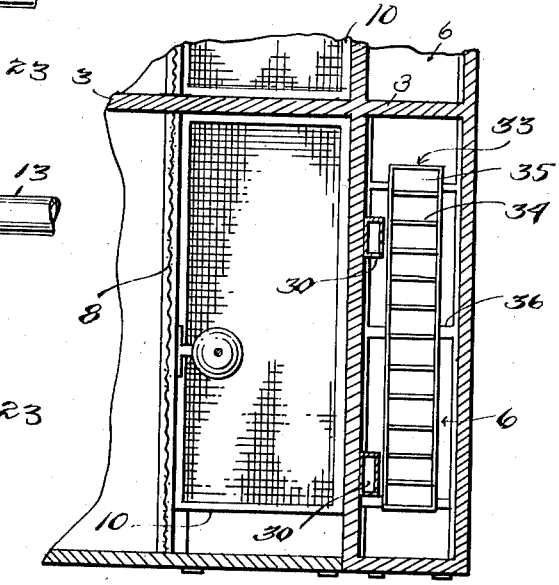
Inventor
A. T. Pope

UNITED STATES PATENT OFFICE.

ALFRED THRUSTON POPE, OF LOUISVILLE, KENTUCKY, ASSIGNOR OF ONE-HALF TO CURRAN POPE, OF LOUISVILLE, KENTUCKY.

HEATING, VENTILATING, AND HUMIDIFYING SYSTEM FOR INCUBATORS.

1,303,722. Specification of Letters Patent. Patented May 13, 1919.

Application filed April 27, 1917. Serial No. 165,024.

*To all whom it may concern:*

Be it known that I, ALFRED THRUSTON POPE, a citizen of the United States, residing at Louisville, county of Jefferson, and State of Kentucky, have invented certain new and useful Improvements in Heating, Ventilating, and Humidifying Systems for Incubators; and I do hereby declare the following to be a full, clear, and exact description of the invention, such as will enable others skilled in the art to which it appertains to make and use the same.

This invention relates to a heating, ventilating and humidifying system for incubators which is more particularly designed for the heating and ventilating of sectional incubators.

The primary object of the invention resides in the provision of a sectional incubator wherein the heating of the several sections is produced from a common source, and wherein the heating means for each section induces a circulation of air which is drawn into the section, passes through the egg drawers, and thence escapes to the atmosphere.

A further object of the invention resides in so constructing the incubator that the regulation of the heating and ventilation of each section will be independent of the remaining sections, and in which the flow of air will be proportional to the temperature in the section.

A still further object of the invention resides in the provision of a humidifier by means of which the incoming air may be supplied with the proper amount of moisture under all conditions of the atmospheric air.

With these and other objects in view, such as will appear as my description progresses, my invention comprises the combination and arrangement of parts, as set forth in and falling within the scope of the appended claims.

In the drawings:—

Fig. 3 is a fragmental vertical sectional view through a portion of one of the sections, the section being taken at right angles to Fig. 1 and on line 3—3 of Fig. 1;

Fig. 4 is a fragmental section on line 4—4 of Fig. 3;

Fig. 5 is a perspective view of the heating coils illustrating the manner in which they are connected to the heating mains, and indicating by means of arrows, the path of flow of the water through the coils;

Fig. 6 is a fragmental plan view taken above the uppermost distributer;

Fig. 7 is a fragmental horizontal sectional view looking down upon the egg drawers and the humidifying pan, on line 7—7 of Fig. 1; and Fig. 8 is a vertical sectional view illustrating the manner in which the escape ducts for the air are arranged with respect to the pans and the compartments, on line 8—8 of Fig. 6.

Figure 1:
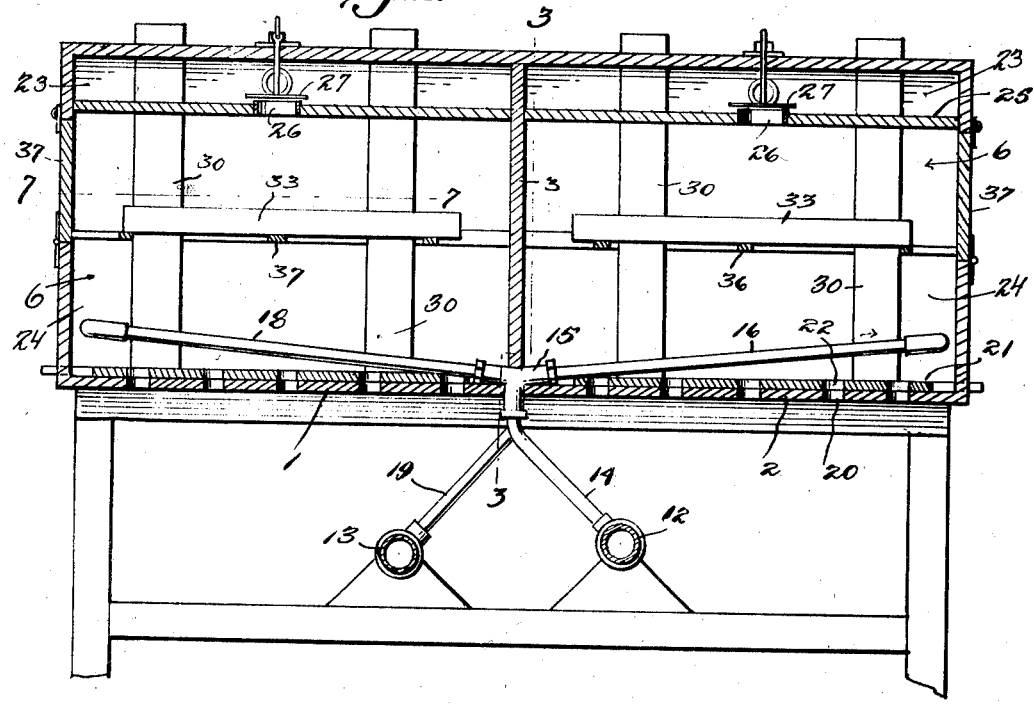
Figure 1 is a sectional view taken transversely of a sectional incubator, but longitudinally of one of the sections.
Figure 2:
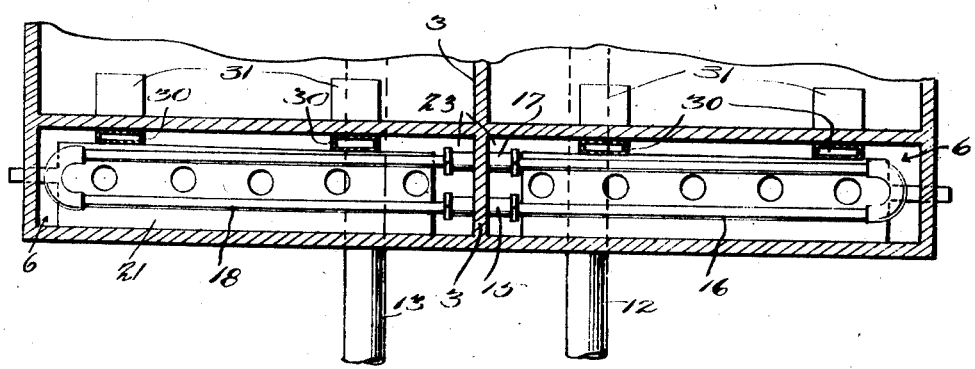
Fig. 2 is a fragmental horizontal sectional view illustrating the position of the heating coils.

In the drawings, I have illustrated one section of a sectional incubator, which section comprises a pair of compartments 1 and 2, which are defined by a dividing wall 3, and each of which is provided with doors through which the egg drawers are adapted to be inserted. Each of these chambers 1 and 2 is divided, by means of a partition 4, into an egg chamber 5 and what I will term an air chamber 6. Each of the egg chambers is provided with one or more walls 7, above which and below which are screened openings 8 and 9, and between which walls the egg drawers 10 are slidably supported on cleats 11, so that they may be readily removed from the incubator.

In order that the egg chambers may be properly supplied with fresh heated air at the correct temperature, and in order that this air may circulate to produce the proper ventilation of the chambers, I have provided hot-water mains 12 and 13, the former of which is the supply main, and the latter of which is the return main. The former main is supplied with hot water from a suitable source, such as a boiler, disposed at the end of the incubator. The mains extend below all of the sections of the incubator, so that the water may be taken from the main 12 and returned to the main 13 for use in any one or all of the incubator sections. Extending upwardly from the main 12 below each chamber 6 is a pipe 14 which is connected to a T 15 located as illustrated in Fig. 1. To one arm of this T, one end of a coil 16 is attached, the other end of which coil is attached to one leg of a T 17. This coil extends at the lower end of the chamber 6 and throughout the length of the same, as illustrated in Fig. 1. A second coil 18 is attached to the T's 15 and 17 and is located in the chamber 6 of the other compartment of the section. This arrangement is carried out throughout the several sections of the incubator. Thus, the water will flow from the source through the main 12, the pipe 14, where it will divide and flow through the coil 16 and the coil 18, and thence through a common return pipe 19 back to the return main 13, and thence to the source. Arranged beneath the coils 16 and 18, and the corresponding coils in each of the sections, is a plurality of openings 20, the effective sizes of which may be varied by slides 21 having corresponding openings 22 therein. Each of the chambers 6 is divided into an upper compartment 23 and a lower compartment 24 by a partition 25, in which partition a flue 26 is formed, the opening and closing of which flue is controlled by a thermostat-controlled damper 27, the thermostat being of any suitable or preferred form. Extending from each compartment 23 into the adjacent egg chamber, near the top thereof, is a double Y-shaped pipe 28, through which the air which reaches the compartment 23 flows, and which pipe is located above a porous distributer 29, which is made of burlap, or any other suitable material. The pipe 28 is made of double Y shape, so that the air will be evenly distributed above each and every one of the egg drawers, and thus will have an even flow over and between the eggs. Extending upwardly and through the top of each of the chambers 6 is a plurality of escape ducts 30, each of which is provided with an angular portion 31 extending through the partition 4 and into the lower part of the egg chamber 5, which ducts are so arranged that the air may pass from the egg chamber to the atmosphere. Arranged immediately above the extensions 31 of these ducts is a second distributer 32 which is of porous material, such as burlap or the like, and which assists in the distribution of the air in its flow through the air chamber.

Thus it will be seen that the heat in the egg chamber will cause the expansion of the thermostat, and the consequent opening of the damper 27, at which time, the fresh air will pass upwardly through the openings 20 and around the coil 16 or 18, where it will be heated. It will thence pass upwardly through the compartment 24 of the air chamber 6 and into the compartment 23 through the flue 26. From this compartment 23, it will flow through the pipe 28 and thence downwardly through the egg chamber and will again pass to the atmosphere through the ducts 30. Of course, it will be obvious that the rapidity of flow of this air will be governed to some extent by the thermostat-controlled damper 27 and also by the slide 21, so that the rapidity of flow of the air will be proportional to the temperature in the egg chamber. By this arrangement, the egg chamber will be continuously supplied with fresh air which will pass around and between the eggs only once, and then will escape to the atmosphere, and which will be always at the proper temperature.

Of course, it is not always feasible to depend upon the humidity of the incoming air to supply the proper moisture to the eggs, and in order that the humidity of the air may be positively controlled and varied at the will of the operator, I have provided in each of the air chambers 6, a pan 33, which pan is divided by transverse walls 34 into a series of containers 35. This pan is supported on a suitable frame 36 and may be removed from the chamber 6 through a door 37. Thus, all or any number of the containers 35 may be filled with water, and, consequently, the evaporating surface varied within wide limits. By this arrangement, the evaporation of the water will not only be controlled by the rapidity of the flow of the air and the temperature of the same, but also may be positively controlled by the operator, since the evaporation surface may be varied at his will, and according to the degree of humidity of the outside air.

Thus it will be seen that I have provided a simple, yet effective means for heating a sectional incubator and supplying the same with a continuous flow of fresh air with which the proper amount of moisture is intermingled.

What I claim is:—

1. In an incubator, an egg chamber, an air chamber having communication with the atmosphere through openings and having communication with the egg chamber through distributing means located adjacent to the top of the egg chamber, the egg chamber receiving air only from the air chamber, ducts, independent of the heating means, establishing communication between the bottom of the egg chamber and the atmosphere, a heating device located in the air chamber adjacent to the openings therein and active only to heat the air in the air chamber, and means for regulating the transfer of heat from the air chamber to the egg chamber and means within the air chamber for supplying moisture to the incoming air.

2. In an incubator, an egg chamber, an air chamber having communication with the atmosphere through openings and having communication with the egg chamber through distributing means located adjacent to the top of the egg chamber, the egg chamber receiving air only from the air chamber, ducts, independent of the heating means, establishing communication between the bottom of the egg chamber and the atmosphere, a heating device located in the air chamber adjacent to the openings therein and active only to heat the air in the air chamber, means for regulating the flow of air from the air chamber to the egg chamber, and a multi-compartment humidifier in the air chamber.

3. In a sectional incubator, each section of which has a compartment divided into egg and air chambers, a heat supply system common to all of said sections, heat conducting coils extending from said system into each air chamber and traversing its lower end only, the air chamber having air openings adjacent to said coils and having communication with the egg chamber at the upper end of the latter, the egg chamber receiving air only from the air chamber, means for regulating the flow of heated air from the air chamber to the egg chamber, a multi-compartment humidifier in the air chamber, and ducts establishing communication between the egg chambers and the atmosphere.

4. In a sectional incubator, each section of which has a compartment divided into egg and air chambers, a heat supply system common to all of said sections, heat conducting coils extending from said system into each air chamber and traversing its lower end only, the air chamber having air openings adjacent to said coils and having communication with the egg chambers at the upper ends of the latter, the egg chambers receiving air only from the air chambers, ducts establishing communication between the egg chambers and the atmosphere, a multi-compartment moisture-containing pan in each of said air chambers, and a damper for controlling the communication between the air chamber and egg chambers.

5. In an incubator, a pair of compartments, each of which is divided into egg and air chambers, heating coils in the air chambers only, common supply and return pipes for the heating coils, said air chambers having communication with the atmosphere and with the egg chambers above the egg drawers, the egg chambers receiving air only from the air chambers, air ducts extending from the egg chambers below the egg drawers through the air chambers and out of the top of the same, multi-compartment moisture pans in the air chambers, and means for regulating the flow of air through the air chambers to the egg chambers.

6. In an incubator, an egg chamber, an air chamber having communication with the atmosphere and having communication with the egg chamber at the upper end of the latter, a variable surface humidifier in the air chamber, means for heating the air in the air chamber below the humidifier, whereby the heated and moistened air will pass into the upper end of the air chamber, said egg chamber receiving air only from the air chamber, and means within the egg chamber for distributing the heated and moistened air evenly over the egg drawer.

7. In an incubator, an egg chamber, an air chamber divided into two compartments, one of which has communication with the egg chamber, and the other of which has communication with the atmosphere, a variable surface humidifier in the latter compartment, means for heating the air in said compartment, and means for regulating the flow of heated moistened air from the latter compartment into the former compartment.

8. A self contained sectional incubator unit comprising a casing divided into egg and air compartments, the air compartment being divided into two chambers, one of which communicates directly with the atmosphere and the other of which communicates with the egg compartment and the last mentioned air chamber, a variable surface humidifier in the first mentioned chamber, means for heating the incoming air in the air chamber, and means for automatically regulating the flow of the heated and moistened air from the last mentioned chamber.

In testimony whereof I affix my signature.

ALFRED THRUSTON POPE.